United States Patent [19]
Weisfield

[11] Patent Number: 5,744,807
[45] Date of Patent: Apr. 28, 1998

[54] SENSOR ARRAY DATA LINE READOUT WITH REDUCED CROSSTALK

[75] Inventor: Richard L. Weisfield, Los Altos, Calif.

[73] Assignee: Xerox Corporation, Stamford, Conn.

[21] Appl. No.: 667,202

[22] Filed: Jun. 20, 1996

[51] Int. Cl.$^6$ .......................... H01L 27/14; H01L 31/00; G01T 1/24
[52] U.S. Cl. .................. 250/370.09; 250/208.1; 250/370.08
[58] Field of Search .......... 250/370.09, 370.08, 250/208.1, 332

[56] References Cited

U.S. PATENT DOCUMENTS

| | | | |
|---|---|---|---|
| 5,132,541 | 7/1992 | Conrads et al. | 250/370.09 X |
| 5,153,423 | 10/1992 | Conrads et al. | 250/370.09 X |
| 5,194,736 | 3/1993 | Meulenbrugge et al. | 250/370.09 X |
| 5,319,206 | 6/1994 | Lee et al. | 250/370.09 |

*Primary Examiner*—Edward J. Glick

[57] ABSTRACT

A system includes a sensor array with scan lines, data lines, and, for each cell, a sensing element and a switching element. Each sensing element includes a charge collection electrode. The sensing elements are stimulated during an interval in which data lines are electrically connected to a fixed potential, reducing induced charge and crosstalk. The stimulation could, for example, be x-ray radiation. Then, during a following interval, a scan signal has a duty interval after which signals are read out from the data lines. During stimulation, the data lines can be connected to ground or can be connected to virtual ground by resetting their sense amplifiers.

11 Claims, 4 Drawing Sheets

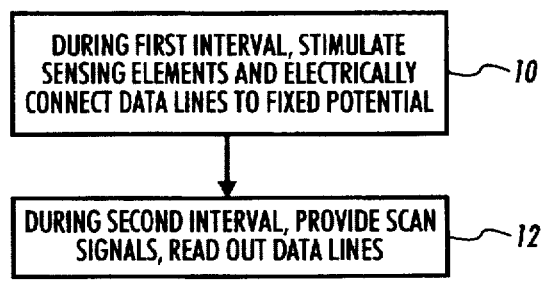
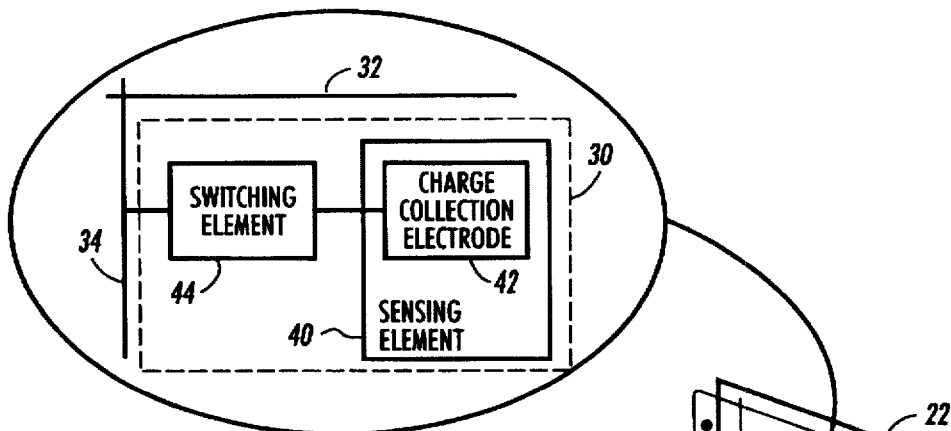
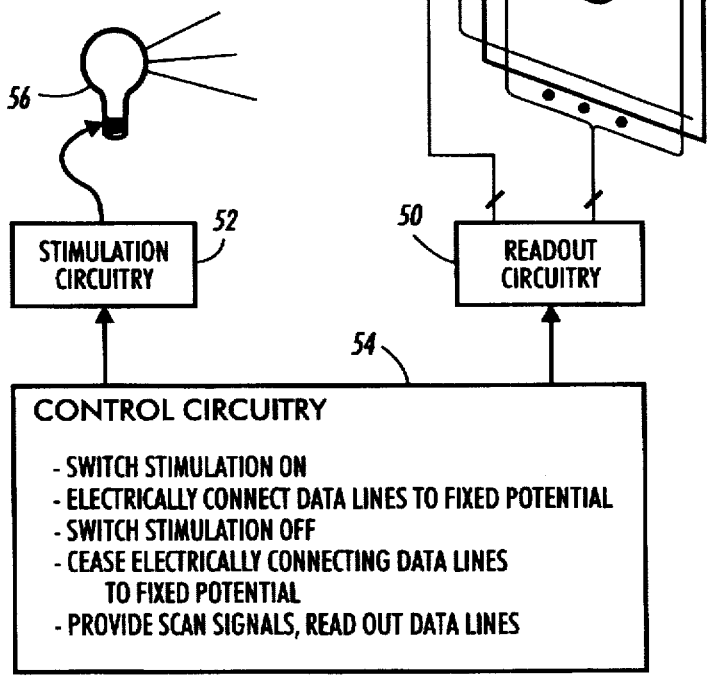

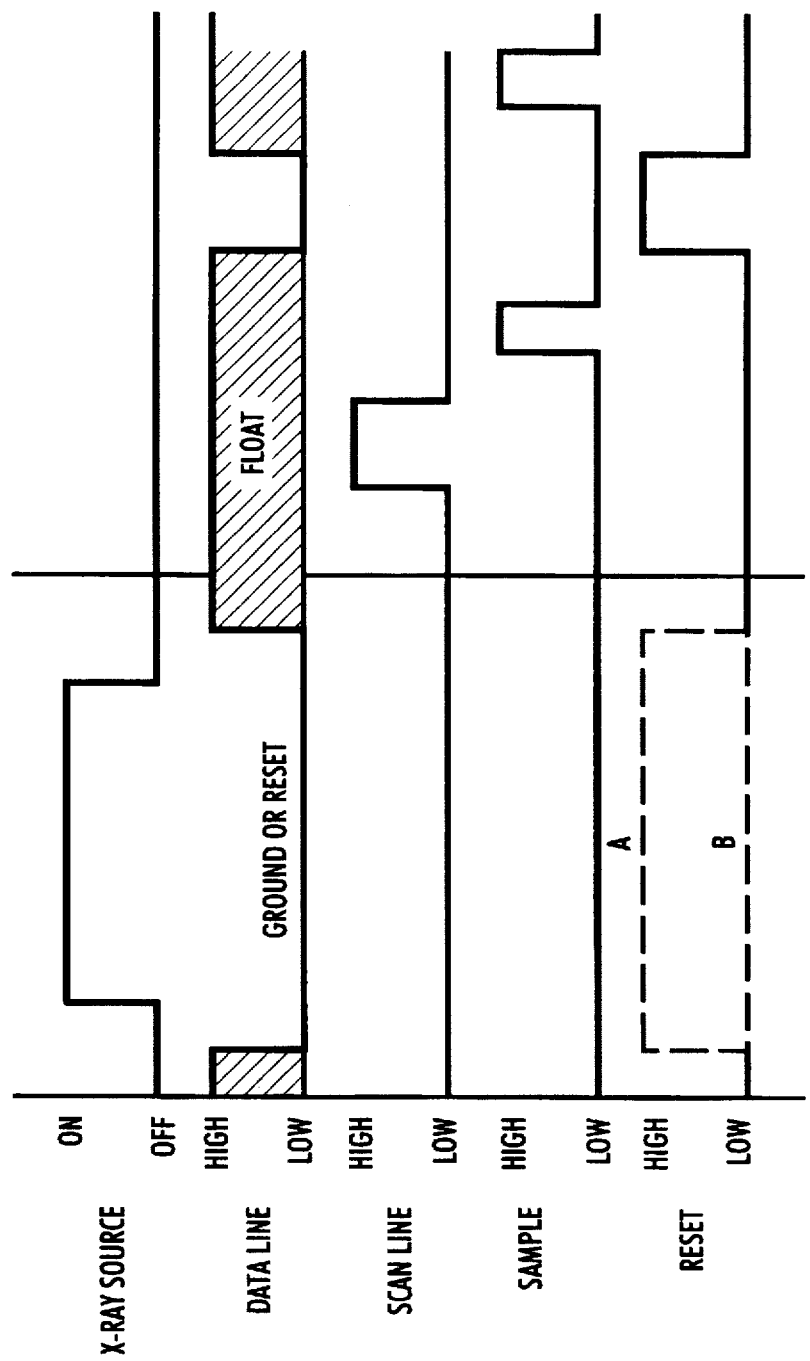

SENSOR ARRAY DATA LINE READOUT WITH REDUCED CROSSTALK

BACKGROUND OF THE INVENTION

The present invention relates to sensor arrays. More specifically, the invention relates to techniques for reading out signals from a sensor array.

Lee et al., U.S. Pat. No. 5,319,206, describe techniques for acquiring x-ray images using solid state devices. As shown and described in relation to FIGS. 2–8, a bias voltage is applied to all address lines to cause each pixel's transistor to be conductive and a voltage is applied to an array reset line to cause array reset transistors connected to each sense line to short charge storage capacitors connected to the sense line to ground. A different voltage is then applied to all address lines, causing each pixel's transistor to become non-conductive, and the array reset transistors similarly become non-conductive. After a predetermined time period, x-ray flux is interrupted, and each address line is sequentially addressed. Charges flow to the sense lines and to the input of amplifying charge detectors. After the signals from one line of pixels along an address line are read out, the charge amplifiers are reset and a next address line is addressed, and so forth until all charge storage capacitors have been sampled. Then signals are applied to erase the trapped charges before capturing another image.

SUMMARY OF THE INVENTION

The invention is based on the recognition of a basic problem that can arise in sensor arrays with conductive charge collection electrodes and lines carrying signals from cells of the array to the array's periphery, referred to herein as "data lines." During readout of stored charge, a data line is electrically connected to one charge collection electrode at a time. But capacitive coupling between the data line and other nearby components, especially charge collection electrodes, can result in readout errors.

Capacitive coupling results in "crosstalk," an error offset that results from induced charge on a data line, especially from charge collection electrodes capacitively coupled to the data line but possibly also from other capacitively coupled components. Crosstalk modifies the charge that is read from the data line. Crosstalk can also modify the charge stored on capacitively coupled electrodes, resulting in an error when the stored charge is read out. Therefore, crosstalk degrades an image obtained from the array.

When crosstalk occurs, the charge on a data line after it is electrically connected, through switching, to a charge collection electrode will be a summation of charges. The summation includes not only the charge that had been stored by the switched electrode but also the induced charge due to capacitive couplings to other adjacent charge collection electrodes. If the array is illuminated, referred to as "continuous illumination," or otherwise stimulated during readout, the induced charge due to capacitive coupling will fluctuate during readout, but induced charge may be present even if the array is not stimulated during readout, as in the above-described technique of Lee et al., for example.

The crosstalk problem is likely to become more important in the future, because techniques have been proposed in which charge collection electrodes overlap data lines, increasing capacitive coupling. Furthermore, as the cells of an array are reduced in size, each cell's total capacitance is likely to decrease, so that to the error offset due to capacitive coupling to electrodes and to other components such as scan lines, thin film transistors (TFTs), and to metal vias will become proportionally larger.

The invention is based on the discovery of a readout technique that alleviates the crosstalk problem. The technique electrically connects data lines to a fixed potential during an interval in which the array's sensing elements are stimulated, such as by being illuminated. This causes charge induced on the data lines due to capacitive coupling to flow to ground. After stimulation ceases, the charge stored by each charge collection electrode stays constant. Therefore, no further capacitively coupled charge can flow into the data lines. The data lines that have been connected to fixed potential can be used to read out signals from charge collection electrodes without crosstalk.

The readout technique can be implemented as a method of operating a system that includes a sensor array. The sensor array includes array circuitry with data lines, scan lines, and for each data line/scan line pair, cell circuitry. The cell circuitry of each data line/scan line pair includes a sensing element and a switching element. The sensing element, which includes a charge collection electrode, receives a stimulus and provides an electric signal indicating a measure of the received stimulus. The switching element responds to a scan signal on the scan line by electrically connecting the data line and a data lead of the charge collection electrode to provide the electric signal from the sensing element to the data line.

During a first interval, the method stimulates the sensing elements and electrically connects a set of the data lines to a fixed potential. During a second interval after the first interval, the method provides, on each of a set of the scan lines, a scan signal that includes a duty interval. After the duty interval of the scan signal on each scan line in the set, the method reads out signals from at least one of the data lines. For example, the set of data lines can include all the data lines, and the set of scan lines can include all the scan lines.

Electrically connecting the data lines to a fixed potential prevents an induced charge due to capacitive coupling. Therefore, the method alleviates the crosstalk problem.

If the system includes a fixed potential switching element for electrically connecting each data line to the fixed potential in response to a fixed potential signal, the method can provide the fixed potential signal to the fixed potential switching element of the data lines in the set to connect them to the fixed potential. If the system includes, for each data line, a readout amplifier electrically connected to the data line, the method can hold the readout amplifiers of the data lines in the set in reset mode to connect them to the fixed potential.

In the act of stimulating the sensing elements and electrically connecting the set of data lines, the method can electrically connect the set of data lines to the fixed potential while stimulating the sensing elements. The method can continue to electrically connect the set of the data lines to the fixed potential after ceasing to stimulate the sensing elements. Then, the method can cease to electrically connect the set of the data lines to the fixed potential before beginning the second interval.

The readout technique can also be implemented in a system that includes a sensor array as described above; readout circuitry connected to the scan lines and the data lines; stimulation circuitry for stimulating the sensing elements; and control circuitry. The control circuitry can switch the stimulation circuitry to its on state to begin stimulating the sensing elements; operate the readout circuitry to electrically connect a set of the data lines to a fixed potential while the sensing elements are stimulated; switch the stimulation circuitry to its off state to cease stimulation; operate the readout circuitry to cease electrically connecting the set of the data lines to the fixed potential; then operate the readout circuitry to provide, on each of a set of the scan lines, a scan signal that includes a duty interval; and, after the duty interval, operate the readout circuitry to read out signals from at least one of the set of data lines.

The technique can be applied, for example, in a system in which the charge collection electrode of the cell circuitry of each overlaps the data line. The control circuitry can operate the readout circuitry to connect data lines to fixed potential before switching on the stimulation circuitry. The sensing elements can be sensitive to electromagnetic radiation, and the stimulation circuitry can include a source of electromagnetic radiation such as an x-ray source.

The technique described above is advantageous because it alleviates crosstalk between data lines and other nearby conductive components in a sensor array, especially charge collection electrodes. Therefore, the technique makes it possible to obtain more accurate gray scale resolution in a sensor array. The technique is especially advantageous in a vertically integrated sensor array.

The following description, the drawings, and the claims further set forth these and other aspects, objects, features, and advantages of the invention.

BRIEF DESCRIPTION OF THE DRAWINGS

FIG. 1 is a flow chart showing general acts in operating a system so that data lines are electrically connected to fixed potential during an interval in which sensing elements are stimulated.

FIG. 2 is a schematic block diagram showing a system in which the acts in FIG. 1 can be performed.

FIG. 5 is a timing diagram showing signals that could be produced during operation of the system in FIG. 4.

DETAILED DESCRIPTION

A. Conceptual Framework

Figure 3:
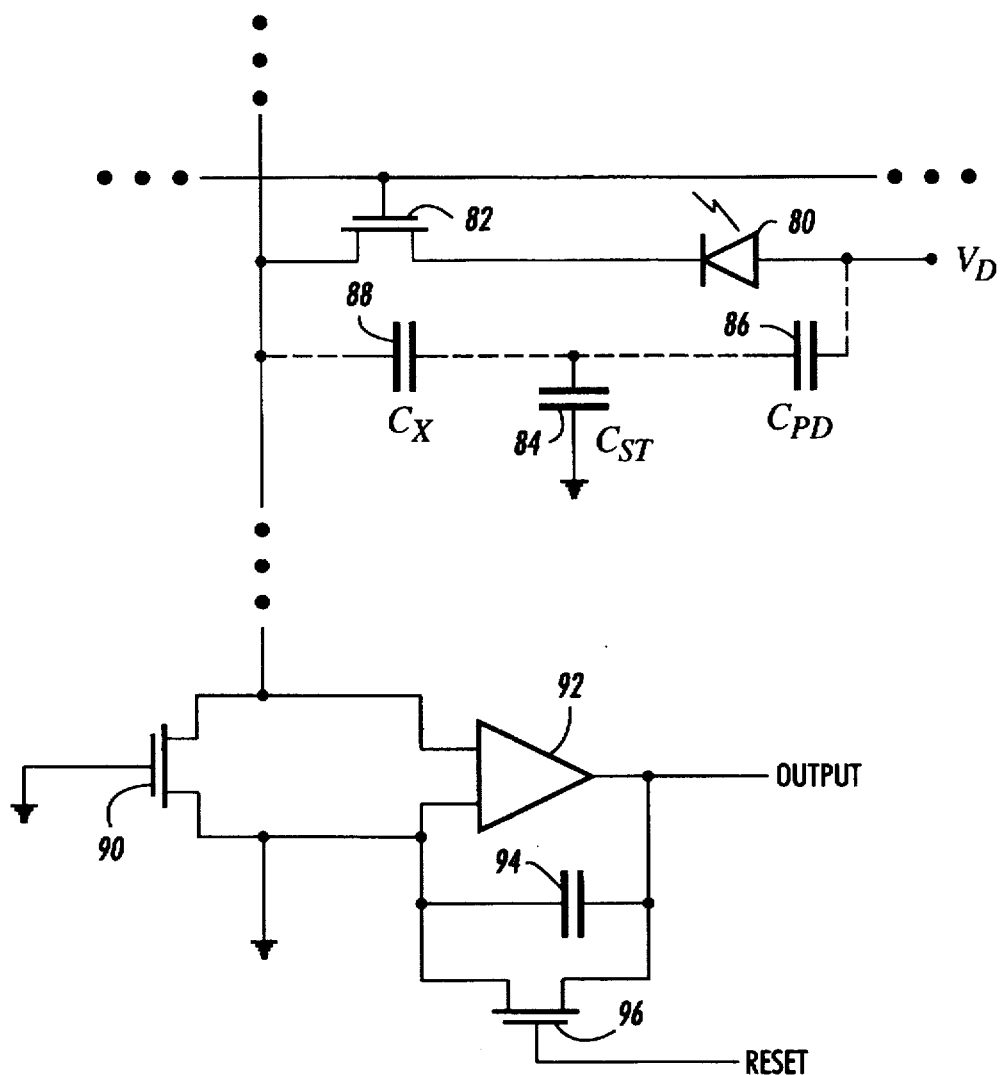
FIG. 3 is a schematic circuitry diagram showing circuitry for electrically connecting a data line to a fixed potential.

The following conceptual framework is helpful in understanding the broad scope of the invention, and the terms defined below have the indicated meanings throughout this application, including the claims. "Circuitry" or a "circuit" is any physical arrangement of matter that can respond to a first signal at one location or time by providing a second signal at another location or time, where the timing or content of the second signal provides information about timing or content of the first signal. Circuitry "transfers" a first signal when it receives the first signal at a first location and, in response, provides the second signal at a second location.

A component of circuitry performs an operation or a function "automatically" when it performs the operation or function independent of concurrent human control.

Any two components are "connected" when there is a combination of circuitry that can transfer signals from one of the components to the other. For example, two components are "connected" by any combination of connections between them that permits transfer of signals from one of the components to the other. Two components are "electrically connected" when there is a combination of circuitry that can transfer electric signals from one to the other. Two components could be electrically connected even though they are not physically connected, such as through a capacitive coupling.

When circuitry transfers a signal from a first component to a second component, the first component "provides" the signal, and the second component "receives" the signal. A "signal interval" is a period of time during which a signal is provided or received.

An "electric circuit" is a circuit within which components are electrically connected. An "electric structure" is a physical structure that includes one or more electric circuits.

A "substrate" or "chip" is a unit of material that has a surface at which circuitry can be formed or mounted. An "insulating substrate" is a substrate through which no electric current can flow.

A "layer" is a thickness of material formed over a surface and extending generally parallel to the surface, with one side toward the surface and another side away from the surface. A layer may include two or more layers within it, referred to as "sublayers." A layer may be homogeneous or its composition may vary.

A layer of an electric structure is "structured for" performing a function if the layer has a thickness and composition such that it can perform the function. For example, characteristics of the material in a homogeneous layer and its thickness may enable it to perform the function. Or characteristics of sublayers in a layer may enable the layer to perform the function.

An operation "deposits" a layer by depositing material to form the layer, such as by physical or chemical vapor deposition.

A "patterned layer" is a layer that forms a pattern. For example, a patterned layer may be formed by removing part of a layer to form a pattern or by depositing a layer in a pattern.

To perform "lithography" or to "lithographically pattern" is to use a radiation source to transfer a mask pattern to a layer of radiation-sensitive material and then to develop the radiation-sensitive material to obtain a positive or negative copy of the mask pattern.

A "thin-film structure" is an electric structure that is formed at a surface of an insulating substrate. A thin-film structure could be formed, for example, by depositing and lithographically patterning films on the insulating substrate's surface.

An "integrated circuit" is a circuit formed at a substrate's surface by batch processes such as deposition, lithography, etching, oxidation, diffusion, implantation, annealing, and so forth.

In an electric structure at a surface, a part of a first layer "covers" or "has a shape that covers" or "is over" a part of a second layer if the part of the second layer is between the part of the first layer and the surface.

A "lead" is a part of a component at which the component is electrically connected to other components. A "line" is a simple component that extends between and electrically connects two or more leads. A line is "connected between" the components or leads it electrically connects. A lead of a component is "connected" to a lead of another component when the two leads are electrically connected by a combination of leads and lines. In an integrated circuit, leads of two components may also be "connected" by being formed as a single lead that is part of both components.

The terms "array" and "cell" are related: An "array" is an article of manufacture that includes an arrangement of "cells." For example, a "two-dimensional array" or "2D array" includes an arrangement of cells in two dimensions. A 2D array of circuitry may include rows and columns, with a line for each row and a line for each column. Lines in one direction may be "data lines" through which a cell receives or provides signals, referred to as "data signals," that determine or indicate its state. Lines in the other direction may be "scan lines" through which a cell receives a signal, referred to as a "scan signal," enabling it to receive signals from or provide signals to its data line.

In an array of circuitry, "cell circuitry" is circuitry connected to a cell's scan line and data line.

A scan signal's "duty interval" is the signal interval during which a cell connected to receive the scan signal is enabled to receive or provide data signals through its data line.

A "channel" is a part of a component through which electric current can flow. A channel is "conductive" when the channel is in a state in which current can flow through it.

A "channel lead" is a lead that connects to a channel. A channel may, for example, extend between two channel leads.

A "switching element" is a component that includes a channel that extends between two channel leads and that can be controlled to switch between high impedance and low impedance.

A "sensing element" is a component that can receive a stimulus and can provide an electric signal indicating a measure of the received stimulus. The received stimulus could be electromagnetic radiation, pressure, temperature, chemicals, or any other stimulus that can be sensed and measured.

A sensing element may include a "charge collection electrode," meaning a conductive component that functions to collect charge resulting from the received stimulus.

A "conductive layer" is a layer formed of conductive material.

An "insulating layer" is a layer formed of a nonconductive material.

A part of a layer "has an edge" if another, complementary part of the layer has been removed by one or more processes, leaving the part of the layer. The edge is the boundary between part of a layer and its complementary part.

A part of a first layer "overlaps" a part of a second layer and vice versa if the part of the first layer is over and extends beyond an edge of the part of the second layer, but has an edge inside the edge of the part of the second layer. If first and second overlapping parts are separated by a third layer, the part of the third layer that is "between" the overlapping parts is the part between the projection of the first part's overlapping edge onto the third layer and the projection of the second part's overlapping edge onto the third layer.

A "capacitive element" or "capacitor" is a component that stores a voltage level by storing charge. A capacitive element may include two conductive components, called "electrodes," separated by an insulating layer. A "dielectric layer" is an insulating layer that separates the electrodes of a capacitive element.

A "capacitively coupled signal" is a signal that a component receives capacitively rather than through other events, such as flow of direct current to or from the component. "Capacitive coupling" occurs between two components when one of the component receives a capacitively coupled signal from the other.

An "anticoupling layer" is a layer that functions to reduce capacitive coupling between two components.

A component is "at a fixed potential" if, during operation of the circuit, it is connected through a combination of leads and lines to a low impedance component, referred to herein as "fixed potential circuitry," that is treated as being at a fixed potential. For example, an integrated circuit typically has an external ground connection that is treated as zero potential; a component that is connected by a combination of leads and lines to the external ground connection is at a fixed potential and, more specifically, is at ground potential.

B. General Features

FIGS. 1–3 show general features of the invention. FIG. 1 shows how a system with a sensor array can be operated to connect data lines to a fixed potential during stimulation. FIG. 2 shows a system that can operate as in FIG. 1. FIG. 3 shows how a fixed potential switching element and a readout amplifier can be used to electrically connect a data line to a fixed potential.

The act in box 10 in FIG. 1 is performed during a first interval in which sensing elements of the system's sensor array are stimulated. During the first interval, the act in box 10 also electrically connects a set of the data lines in the sensor array to a fixed potential.

The act in box 12 is performed during a second interval after the first. A scan signal is provided on each of a set of the scan lines, with a duty interval. After the duty interval, the act in box 12 reads out signals from at least one of the set of data lines. Because the data lines in the set were connected to the fixed potential during the first interval, error offset due to crosstalk is significantly reduced.

System 20 in FIG. 2 includes sensor array 22, with scan lines, data lines, and, for each data line/scan line pair, cell circuitry 30 as shown in the detail. Cell circuitry 30 is connected to scan line 32 and data line 34.

Cell circuitry 30 includes sensing element 40 with charge collection electrode 42. Sensing element 40 receives a stimulus and provides an electric signal indicating a measure of the received stimulus.

Cell circuitry 30 also includes switching element 44. Switching element 44 responds to a scan signal on scan line 32 by electrically connecting data line 34 and charge collection electrode 42 to provide the electric signal from sensing element 40 to data line 34.

System 20 also includes readout circuitry 50, stimulation circuitry 52, and control circuitry 54. Readout circuitry 50 is connected to the scan lines and data lines in sensor array 22. Stimulation circuitry 52 stimulates the sensing elements of sensor array 22, and is switchable between an on state in which the sensing elements are stimulated and an off state in which they are not; although illustrated as controlling stimulus source 56, stimulation circuitry 52 could include, rather than a source of stimulation, an electromechanical or electrooptical shutter between sensor array 22 and a source of stimulation.

Control circuitry 54 controls readout circuitry 50 and stimulation circuitry 52. In doing so, control circuitry 54 performs operations as shown. Control circuitry 54 switches stimulation circuitry 52 to its on state to begin stimulating the sensing elements of array 22. Control circuitry 54 operates readout circuitry 50 to electrically connect a set of the data lines to a fixed potential while the sensing elements are stimulated. Control circuitry 54 switches stimulation circuitry 52 to its off state to cease stimulation. After stimulation ceases, control circuitry 54 operates readout circuitry 50 to cease electrically connecting the set of data lines to the fixed potential. Then, control circuitry 54 operates readout circuitry 50 to provide, on each of a set of scan lines, a scan signal that includes a duty interval and to read out signals from at least one of the set of data lines after the duty interval.

FIG. 3 shows schematically how data line 70 can be electrically connected to a fixed potential to reduce crosstalk. One cell's circuitry connected to data line 70 and scan line 72 is schematically represented. Although the sensing element could receive any measurable physical stimulus. FIG. 3 illustrates the specific example of a sensing element that receives electromagnetic radiation and provides an electric signal indicating a measure of received radiation. More specifically, the sensing element in FIG. 1 illustratively includes photodiode 80 for receiving light, but photodiode 80 is merely a representative example of the wide variety of components that can receive electromagnetic radiation and other incident stimuli. FIG. 3 also illustratively shows transistor 82, which can function as a switching element. Due to bias voltage $V_D$, when photodiode 80 receives stimulation at the appropriate frequency, a current flows, storing charge on the charge collection electrode. If necessary, the sensing element may include storage capacitor 84, which has a capacitance of $C_{ST}$. As shown, the charge collection electrode can be one of the electrodes of storage capacitor 84 or can be electrically connected to one of the storage capacitor electrodes, the other electrode conventionally being at a fixed potential.

Photodiode 80 has its own capacitance 86, with a capacitance of $C_{PD}$; if $C_{PD}$ provides enough charge storage to meet operating requirements, storage capacitor 16 may be omitted because it is unnecessary.

A coupling capacitance 88 occurs between the charge collection electrode and data line 70, with a capacitance of $C_X$. If the charge collection electrode overlaps data line 70, $C_X$ increases dramatically from the fringing capacitance that would occur if the charge collection electrode and data line 70 were coplanar. Specifically, $C_X = C_{INS} w l$, where $C_{INS}$ is the capacitance per unit area of an insulating layer between the charge collection electrode and data line 70; w is the width of the overlap, which may be equal to the width of data line 70; and l is the length of the overlap, which may be the length of the cell. In contrast, for square cells with length l, $C_{PD} = C_S l^2$, where $C_S$ is the capacitance per unit area of the sensor layer, which occupies approximately the entire cell area, $l^2$.

Crosstalk occurs when induced signals generated at the cells along data line 70 together cause data line voltage to change from the direct signal expected when a duty interval occurs in the scan signal on scan line 72. During the duty interval, transistor 82 is conductive, so that the direct signal from photodiode 80 is provided to data line 70, but induced signals from capacitance 88 and similar induced signals from coupling capacitances of other cells along data line 70 are also present on data line 70, producing an error offset.

Conventionally, readout circuitry resets data line 70 to ground between each readout cycle, nulling out the effect of capacitive coupling. This may be done by providing a signal to a fixed potential switching element such as transistor 90. As a result, the maximum crosstalk signal charge for a particular data line is $0Q_X = N_{GATE} I_{MAX} \tau_{GATE} (C_X/C_T)$, where $N_{GATE}$ is the number of scan lines; $I_{MAX}$ is the current flowing to each charge collection electrode at maximum stimulation, such as photocurrent under full illumination; $\tau_{GATE}$ is the time between readout cycles; and $C_T$ is the total capacitance of the charge collection electrode other than $C_X$ and can be approximated as the sum of $C_{ST}$ and $C_{PD}$. In comparison, during continuous maximum stimulation, the direct signal charge stored by each charge collection electrode $Q_T = I_{MAX} \tau_{FRAME}$, where the frame integration time $\tau_{FRAME}$ also equals $N_{GATE} \tau_{GATE}$. Therefore, the maximum crosstalk error offset is $Q_X/Q_T$, which equals $C_X/C_T$ in the case of continuous maximum stimulation. More generally, $Q_X = \Sigma \{ \int I_{Tn}(t) \, dt \, (C_{Xn}/C_{Tn}) \}$, where the summation is taken from n=1 through $N_{GATE}$, where the integral is taken over the interval from 0 through $\tau_{GATE}$, and where $I_{Tn}$ is the current flowing into the nth charge collection electrode associated with the particular data line and $C_{Xn}$ and $C_{Tn}$ are respectively the crosstalk capacitance and the other capacitance for the nth charge collection electrode.

An example helps to illustrate the seriousness of the crosstalk problem: Assume a 400 spots per inch (spi) sensor array has square cells with a length of 63.5 μm, data line width of 6 μm overlapped 1 μm by each adjacent charge collection electrode, sensor layer thickness of 1.3 μm, and $SiON_X$ insulating layer with dielectric constant K=6 and thickness of 0.6 μm. $C_X$=0.015 pF and $C_T$=0.33 pF, yielding maximum crosstalk error offset of 0.015/0.33=4.5%, which is typically not acceptable.

The crosstalk problem can also be serious even without overlap if each cell is sufficiently small that $C_T$ becomes very small, making $C_X$ more significant. It can be alleviated to some extent by adding a storage capacitor, but this adds to process complexity, may affect yield, and slows readout.

FIG. 3 also illustrates two different ways of using readout circuitry to electrically connect data line 70 to a fixed potential during stimulation. First, a Ground signal can be provided to make transistor 90 conductive during stimulation, so that data line 70 is connected directly to ground. Second, a Reset signal can be provided to amplifier 92 during stimulation. In the illustrated implementation, amplifier 92 has a feedback capacitor 94, and the Reset signal makes transistor 96 conductive, shorting across capacitor 94 so that data line 70 is driven to ground, a state that may be referred to as "virtual ground."

C. Implementation

The general features described above could be implemented in numerous ways. The implementation described below performs readout in an x-ray sensor array.

C. 1. System

Figure 4:
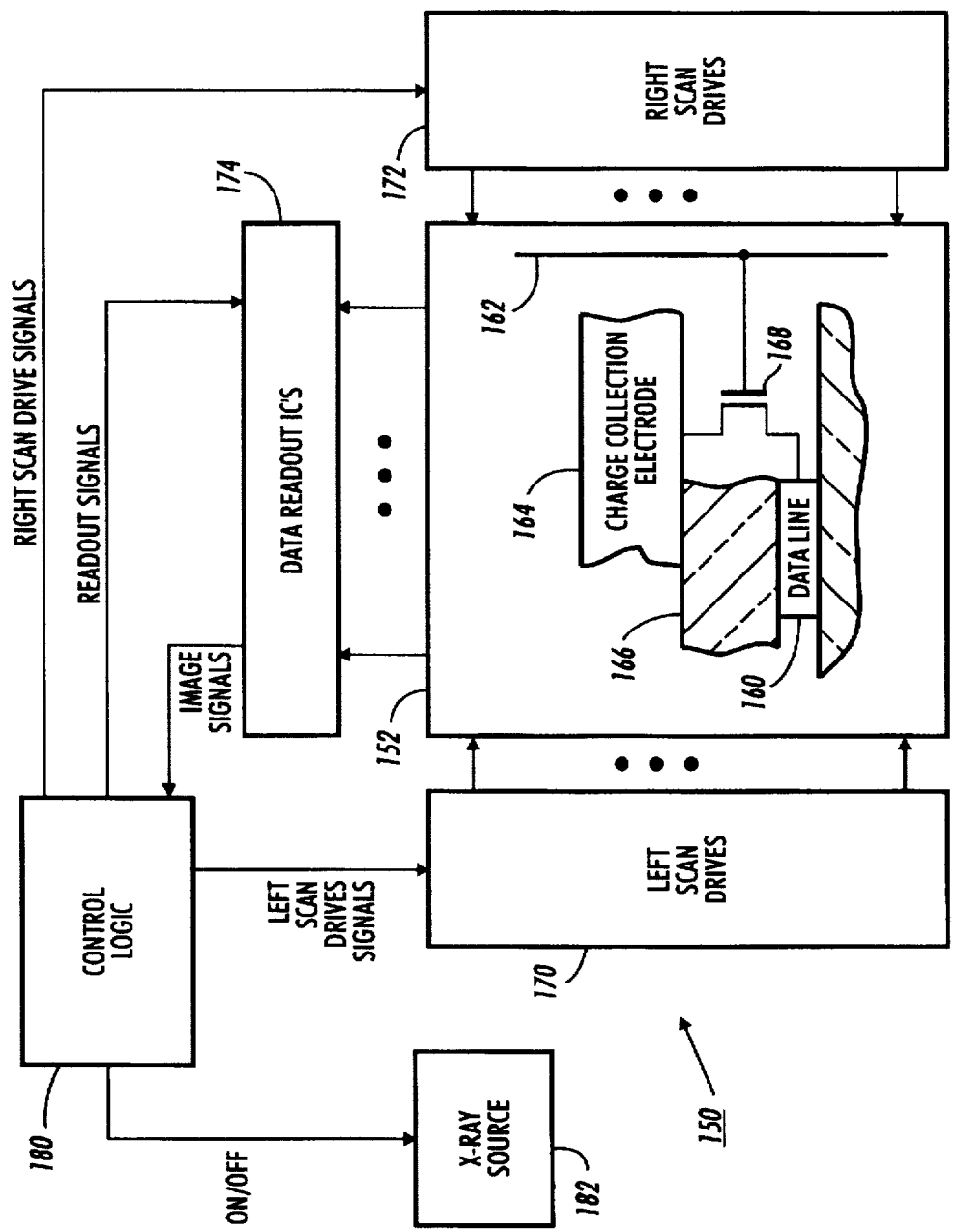
FIG. 4 is shows a system in which the general features of FIG. 1 could be implemented.

FIG. 4 shows a system in which the general features described above could be implemented.

System 150 includes sensor array 152, which includes circuitry formed on the surface of a substrate. Sensor array 152 includes data lines and scan lines. For each data line/scan line pair, sensor array 152 includes cell circuitry, an example of which is illustratively shown with some components shown in cross section and others shown schematically.

Data line 160, shown in cross section, and scan line 162, shown schematically, have cell circuitry that includes a sensing element with charge collection electrode 164, also shown in cross section. In most respects, sensor array 152 can be produced in accordance with the techniques shown and described in copending, coassigned U.S. patent application Ser. No. 08/474,845, entitled "Array Circuitry with Conductive Lines, Contact Leads, and Storage Capacitor Electrode All Formed in Layer that Includes Highly Conductive Metal" ("the Single Layer Application"), incorporated herein by reference. As shown in FIG. 4, however, charge collection electrode 164 and data line 160 overlap, and between them is layer 166 which, if it is an insulating material, functions as the dielectric of a capacitor whose electrodes are data line 160 and electrode 164.

Data line 160, electrode 164, and layer 166 could be implemented in any of the ways described in copending, coassigned U.S. patent application Ser. No. 08/667,198 (Attorney Docket No. D/96303), entitled "Sensor Array with Anticoupling Layer Between Data Lines and Charge Collection Electrodes," incorporated herein by reference.

The Single Layer Application describes techniques in which an array has a conductive element over a layer of highly conductive metal such as aluminum or an alloy, separated by an insulating layer of SiON or another appropriate material. The highly conductive layer includes a data line, leads of a TFT, and a storage capacitor electrode. In an x-ray sensor, the conductive element can serve as a charge collection electrode. As described in relation to FIG. 4, the data lines can be formed in a layer with a sublayer of aluminum sandwiched between upper and lower sublayers of TiW, and the conductive element can be in a layer of ITO, with a layer of SiON between them. As mentioned in relation to FIG. 6, the SiON layer can be deposited to a thickness of 6000 angstroms (6 μm) or thicker if necessary to reduce coupling.

FIG. 4 shows schematically that scan line 162 is connected to the gate of transistor 168, so that a scan signal on scan line 162 can make transistor 168 conductive, permitting charge from charge collection electrode 164 to flow to data line 160. Left scan drivers 170 and right scan drivers 172 can provide scan signals to interleaved scan lines. If sensor array 152 includes 1920 scan lines, for example, left scan drivers 170 and right scan drivers 172 can each include six conventional shift register integrated circuits, such as TMS57202, each wire bonded or TAB connected to drive 160 scan lines.

Data readout ICs 174, the other important part of the readout circuitry of system 150, can similarly be conventional integrated circuits wire bonded or TAB connected to receive signals from the data lines. If sensor array 152 includes 1536 data lines, for example, data readout ICs 174 can include 12 MX4 ICs from Rutherford Appleton Laboratory of Chilton Didcot, Oxfordshire, United Kingdom, each receiving charge from 128 data lines.

Rather than conventional MX4 ICs, a custom IC could be used that is an optimized version of the MX4, but with lower noise amplifiers. Or any other appropriate readout ICs could be used, provided there is a way to operate the readout ICs to electrically connect data lines to a fixed potential. Some conventional readout ICs include circuitry that automatically grounds or resets all data lines during the readout process, while others include circuitry that can be signalled to ground or reset data lines. Almost any conventional readout ICs can be used to implement the invention, although it is more convenient with some than with others.

Some conventional readout ICs automatically perform double correlation sampling and internally subtract the second sample from the first to obtain a difference. The MX4, however, does not subtract internally, instead providing both samples to control logic 180 after sensing and amplifying, with each set of samples being available to be clocked out from a 128 channel shift register. The MX4 also includes a reset switch in each sense amplifier's feedback loop, as illustrated by transistor 96 in FIG. 3, so that the MX4 connects data lines to virtual ground in response to a data line reset signal.

Control logic 180 can automatically provide on and off signals to x-ray source 182, left scan drive signals to left scan drivers 170, right scan drive signals to right scan drivers 172, and readout signals to readout ICs 174. In response, data readout ICs 174 can provide image signals providing data defining an image sensed by sensor array 152.

The left and right scan drive signals include clock signals and any other signals necessary for testing and operation of scan drivers 170 and 172. Readout signals can include clock, start, clear, and inhibit signals and another other signals necessary for testing and operation of data readout ICs 174. Control logic 180 can also provide the power supply and the appropriate level of voltage to grounding circuitry and bias lines.

C.2. Operation

FIG. 5 shows signals that could occur during illumination and readout of sensor array 152.

The signals in FIG. 5 are provided in first and second intervals, also referred to as an illumination/grounding interval and a readout interval. As shown by the upper line, control logic 180 begins providing an on signal to x-ray source 182 shortly after the first interval begins, and begins providing an off signal shortly before the first interval ends, while x-ray source 182 remains off throughout the second interval. An illumination signal of this sort is sometimes referred to as "pulsed illumination." In x-ray imaging, the duration of a pulse of illumination could range from microseconds to milliseconds.

As shown by the second line in FIG. 5, control logic 180 also provides signals during the first interval so that a data line is electrically connected to a fixed potential from before illumination begins until after illumination ends. Control logic 180 could, for example, provide signals that hold each readout IC in a state in which all data lines are connected to ground or in which the reset switches of all sensing amplifiers are closed; with some readout ICs, it may instead be necessary to provide clock signals to advance the readout IC to a time in its readout cycle in which it is grounding or resetting data lines.

As a result of the signals that ground or reset data lines, currents in the sensing elements of the array as a result of illumination cannot couple capacitively to the data line, precluding induced charge on the data line. Nevertheless, the currents in the sensing elements will build up charge on the charge collection electrodes, which can then be read out during the second interval in FIG. 5, during which time the data line is generally free to float except when it is being reset. When the data line is free to float, the charge stored on it is indeterminate, but follows a somewhat predictable pattern—in general it rises gradually as a result of induced charge due to capacitive coupling, but when the scan line goes high the charge on the data line rises rapidly due to the direct signal from the charge collection electrode to which it is electrically connected, as discussed further below.

The third through fifth lines in FIG. 5 illustrate signals that perform a readout operation.

The third line illustrates a scan signal, which remains off throughout the first interval but has a single duty interval during the second interval. During the duty interval, data line 160 receives the charge stored by charge collection electrode 164 through transistor 168. Therefore, even though data line 160 is floating, it stores a level of charge that indicates a measure of illumination received by the sensing element during the first interval.

The fourth line illustrates a sample signal, which causes the output of the sense amplifier connected to data line 160 to be stored for subsequent use. In accordance with the double correlation sampling technique, the sample signal has two duty intervals, one immediately after the duty interval of the scan signal and the other after the data line has been reset. Both of these duty intervals are provided while the data line is floating, but the sample obtained by the first duty interval indicates the measure of illumination received by the sensing element during the first interval, while the sample obtained by the second duty interval only indicates a measure of the induced charge on the data line after the data line is reset.

The purpose of double correlated sampling is to compensate for error offsets in the signal. Therefore, the second duty interval of the sampling signal could be timed to obtain two approximately equal intervals, one between the second duty interval of the preceding illumination-readout cycle and the first duty interval of this cycle, the other between the first and second duty intervals of this cycle. In general, the timing of the double correlation sampling could be adjusted to optimize the signal to noise ratio and minimize crosstalk.

The fifth line illustrates a data line reset signal. During the first interval the data line reset could be used to electrically connect the data line to a fixed potential, as illustrated by the line labeled "A", or other circuitry could be used for that purpose, in which case the data line reset signal follows the line labeled "B." During the second interval, the data line reset signal is provided between the two duty intervals of the sample signal.

C.3. Variations

The implementations described above could be changed in many ways within the scope of the invention.

The implementation described above employs double correlation sampling, but other sampling techniques could be used, and the timing of sampling could be modified to obtain optimal results.

The implementation described above performs stimulation by turning an x-ray source on and off to illuminate a sensor array, but other stimulation techniques could be used, such as by modifying the frequency of radiation, such as by using a visible light source such as an optical flashlamp or an LED, or by using an electromechanical or electrooptical shutter positioned at a focal point in the optics or just in front of the source of stimulation. Furthermore, charge-generating stimuli other than electromagnetic radiation could be used, such as chemicals, pressure, and temperature. The implementation described above provides signals that hold data lines at fixed potential from before illumination begins until after it ends. It may be possible to achieve satisfactory results, however, by periodically connecting data lines to a fixed potential, with each data line being connected to fixed potential several times during illumination. Periodic resetting or grounding may be easier with certain types of readout ICs, while others will have a reset function permitting data lines to be held at fixed potential and still others can be caused to hold data lines at fixed potential by bringing them to an appropriate point in their readout cycle.

The implementation described above employs ICs that are connected by a wire bond or TAB to array circuitry. The invention could be implemented, however, with scan drivers and readout circuitry integrated on the same substrate as the array circuitry. Even if ICs are used, data lines could be connected to fixed potential using externally addressed peripheral TFTs, such as polysilicon TFTs, and the control logic could provide a signal directly to the peripheral TFTs.

The implementation described above employs thin film circuitry on an insulating substrate, such as quartz or glass. The invention could be implemented with other types of circuitry on other types of substrates.

The implementation described above employs circuitry with specific geometric and electric characteristics, but the invention could be implemented with different geometries and with different circuitry.

Various conductive materials could be used in the charge collection electrodes, with ITO being appropriate in an x-ray sensor array with a selenium coating because it provides a blocking contact that blocks injection of charge carriers into the selenium coating at high voltages; further, ITO is transparent, which may be useful in certain applications. Charge collection electrodes formed in a refractory metal, such as chromium, titanium, tungsten, or molybdenum, or their alloys, would prevent interaction with a semiconductor transducer layer. Further, a heavily doped conductive semiconductor layer would block charge injection into a semiconductor transducer layer.

Also, various conductive materials could be used in the scan lines and data lines, including but not limited to any appropriate metal or alloy such as Al with or without layers or barrier metals, ITO, MoTa, Cr, MoCr, Ta, Cu, Ti, TiN, W, hybrid multilayer stacks such as TiW/AlCu, and any appropriate organic conductive materials.

The implementations described above include layers in specific sequences, but the sequence of layers could be modified. For example, it may be possible for the charge collection electrodes to be under the data lines if radiation is received through the substrate. Similarly, any appropriate arrangement of components in each unit of cell circuitry could be used.

The implementation described above is appropriate for x-ray sensor arrays using selenium as a photoconductive material, but the invention could be used with other photoconductive materials and could be used in sensor arrays for radiation in other frequency bands or for stimuli other than electromagnetic radiation that can generate charge, such as chemicals, pressure, and temperature. The photoconductor could be amorphous silicon (a-Si), thallium bromide, lead iodide, or another appropriate material. For example, the invention could be used with an amorphous silicon photosensitive layer in a visible light sensor array.

The above implementation employs TFTs as switching elements, but the invention could be implemented with any appropriate switching elements.

In the above implementation, charge collection electrodes overlap data lines, but the invention could be implemented with charge collection electrodes that do not overlap data lines.

D. Application

The invention could be applied in many ways, including arrays for sensors of various bands of radiation, including x-rays as in the Single Layer Application and light in the visible or near-visible range as in copending, coassigned U.S. patent application Ser. Nos. 08/483,406, entitled "Improved Solid State Sensor," also incorporated herein by reference.

A small, high resolution x-ray sensor array could be used for mammographic imaging, while a larger, low resolution x-ray sensor array could be used as a film replacement in other diagnostic radiology applications.

A large, high resolution photosensor array could be used in a document reader.

E. Miscellaneous

The invention has been described in relation to thin-film implementations, but the invention might be implemented with single crystal technology.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. In a system including:
   a sensor array; the sensor array having array circuitry that includes data lines, scan lines, and for each data line/scan line pair, cell circuitry; the cell circuitry of each data line/scan line pair including:
   a sensing element for receiving a stimulus and for providing an electric signal indicating a measure of the received stimulus; the sensing element including a charge collection electrode; and a switching element for responding to a scan signal on the scan line by electrically connecting the data line and the charge collection electrode to provide the electric signal from the sensing element to the data line;

a method comprising:

during a first interval, stimulating the sensing elements and electrically connecting a set of the data lines to a fixed potential; and during a second interval after the first interval, providing, on each of a set of the scan lines, a scan signal that includes a duty interval and, after the duty interval of the scan signal on a scan line in the set, reading out signals from at least one of the set of data lines.

2. The method of claim 1 in which the system further includes, for each data line, a fixed potential switching element for electrically connecting the data line to the fixed potential in response to a fixed potential signal; wherein said stimulating the sensing elements and electrically connecting a set of the data lines to a fixed potential comprises providing the fixed potential signal to the fixed potential switching element of the data lines in the set.

3. The method of claim 1 in which the system further includes, for each data line, a readout amplifier electrically connected to the data line for receiving signals from the data line; each readout amplifier having a reset mode in which its input and output leads are electrically connected; wherein said stimulating the sensing elements and electrically connecting a set of the data lines to a fixed potential comprises holding the readout amplifiers of the data lines in the set in the reset mode.

4. The method of claim 1 in which the set of data lines includes all the data lines.

5. The method of claim 1 in which the set of scan lines includes all the scan lines.

6. The method of claim 1 wherein said stimulating the sensing elements and electrically connecting a set of the data lines to a fixed potential comprises:

electrically connecting the set of the data lines to the fixed potential while stimulating the sensing elements;

continuing to electrically connect the set of the data lines to the fixed potential after ceasing to stimulate the sensing elements; and ceasing to electrically connect the set of the data lines to the fixed potential before the second interval.

7. A system comprising:

a sensor array having array circuitry that includes data lines, scan lines, and for each data line/scan line pair, cell circuitry; the cell circuitry of each data line/scan line pair comprising:

a sensing element for receiving a stimulus and for providing an electric signal indicating a measure of the received stimulus; the sensing element comprising a charge collection electrode; and a switching element for responding to a scan signal on the scan line by electrically connecting the data line and the charge collection electrode to provide the electric signal from the sensing element to the data line;

readout circuitry connected to the scan lines and the data lines;

stimulation circuitry for stimulating the sensing elements; the stimulating circuitry being switchable between an on state in which the sensing elements are stimulated and an off state in which the sensing elements are not stimulated; and control circuitry for controlling the readout circuitry and the stimulation circuitry; the control circuitry operating to:

switch the stimulation circuitry to the on state to begin stimulating the sensing elements;

operate the readout circuitry to electrically connect a set of the data lines to a fixed potential while the sensing elements are stimulated;

switching the stimulation circuitry to the off state to cease stimulating the sensing elements;

operate the readout circuitry to cease electrically connecting the set of the data lines to the fixed potential; and after ceasing to electrically connect the set of the data lines to the fixed potential, operating the readout circuitry to provide, on each of a set of the scan lines, a scan signal that includes a duty interval and, after the duty interval of the scan signal on a scan line in the set, to read out signals from at least one of the set of data lines.

8. The system of claim 7 in which the charge collection electrode of the cell circuitry of each data line/scan line pair overlaps the data line.

9. The system of claim 7 in which the control circuitry operates the readout circuitry to electrically connect the set of the data lines to the fixed potential before the control circuitry switches the stimulation circuitry to the on state.

10. The system of claim 7 in which each sensing element is for receiving electromagnetic radiation and for providing an electric signal indicating a measure of the received electromagnetic radiation; the stimulation circuitry comprising a source of electromagnetic radiation; the stimulation circuitry stimulating the sensing elements by providing radiation from the source.

11. The system of claim 10 in which the source of electromagnetic radiation is an x-ray source.

\* \* \* \* \*